Nov. 3, 1942.　　　F. S. GRISWOLD　　　2,300,888
FILM SPLICING DEVICE
Filed Feb. 28, 1940　　　6 Sheets-Sheet 1
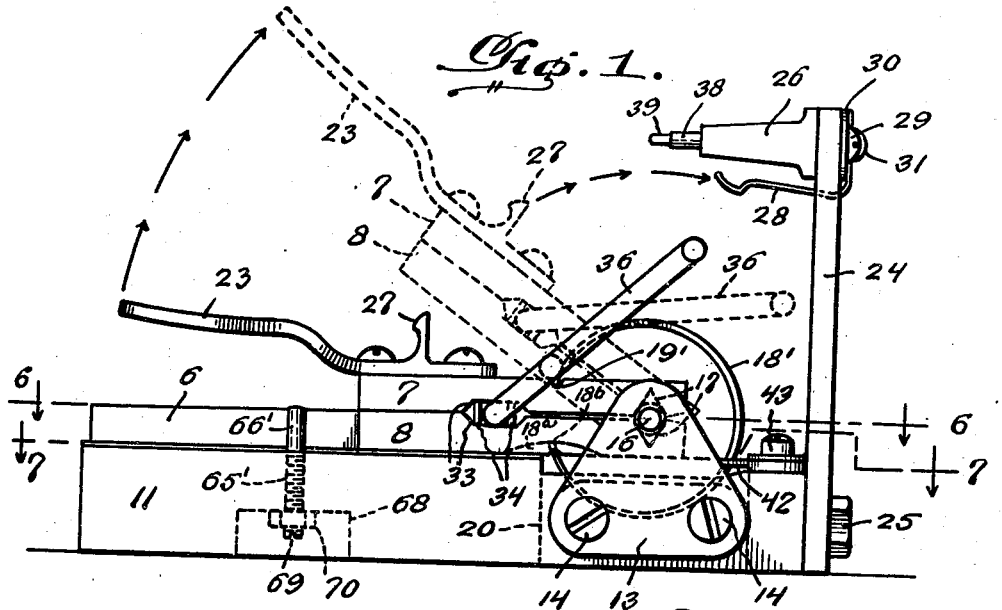
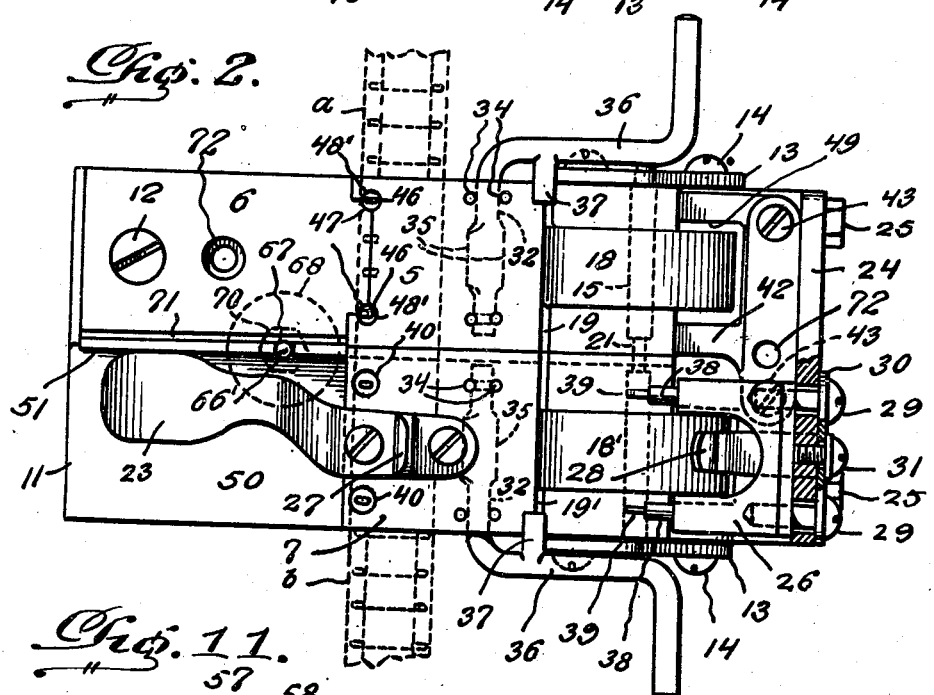
Inventor
Frederick C. Griswold,
By J. Stanley Burch
Attorney

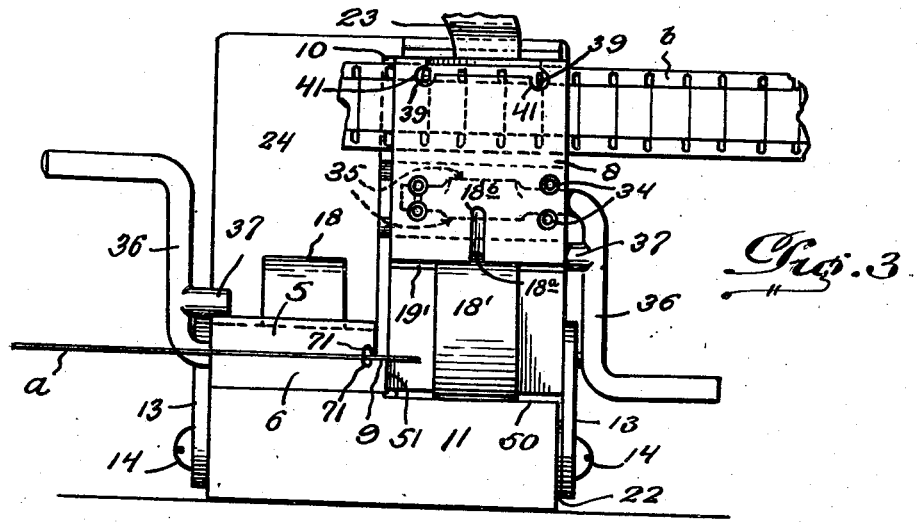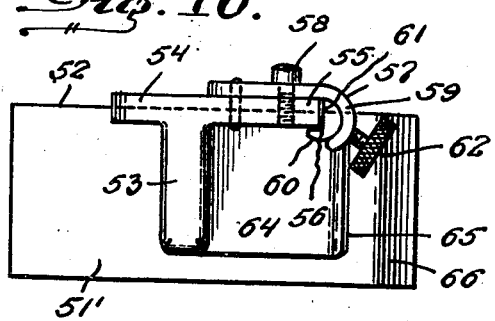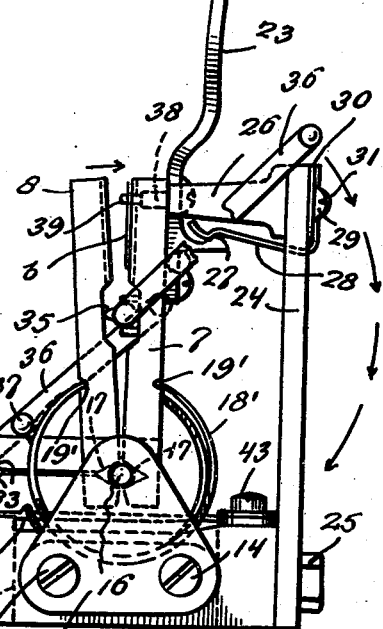

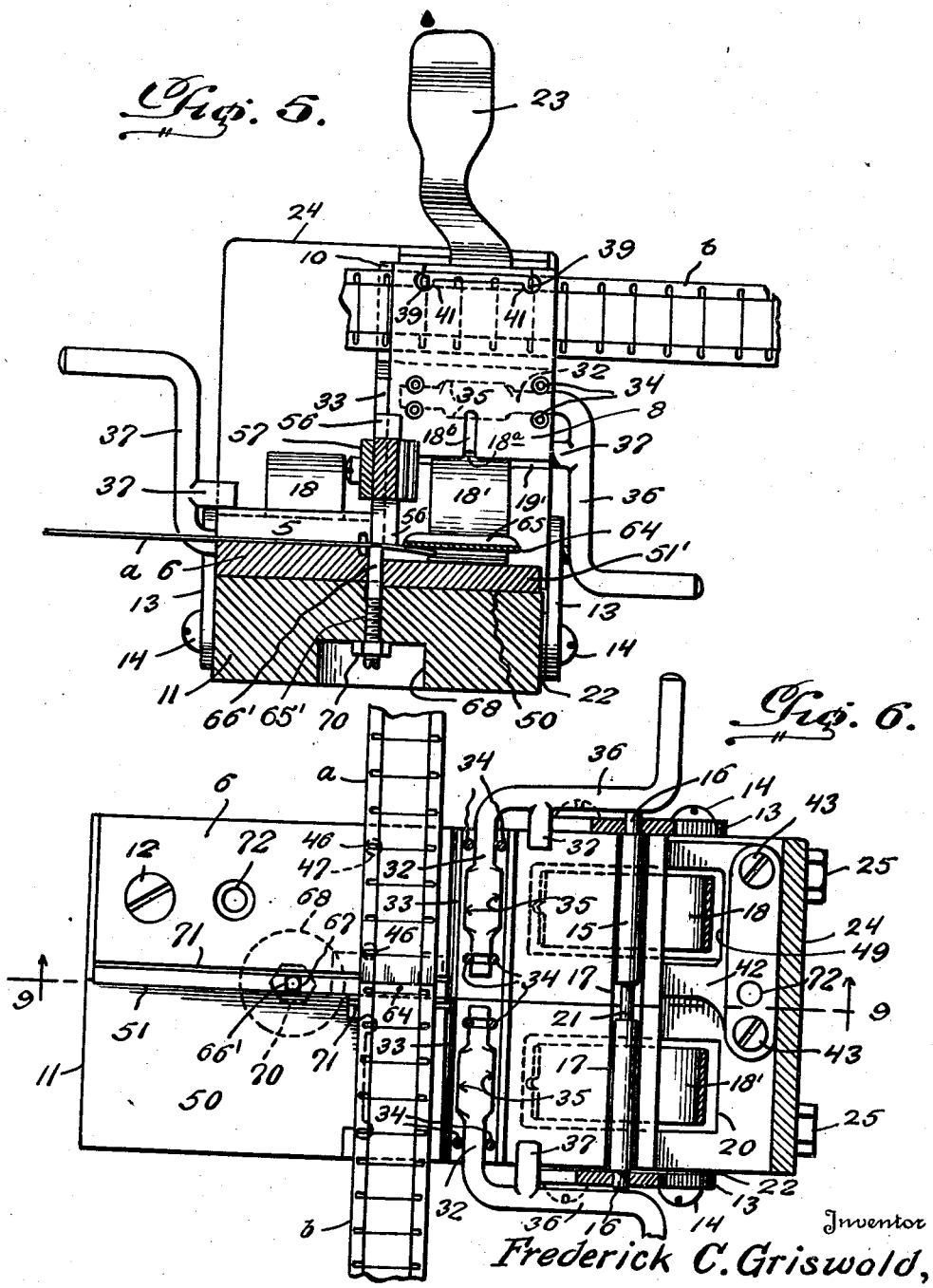

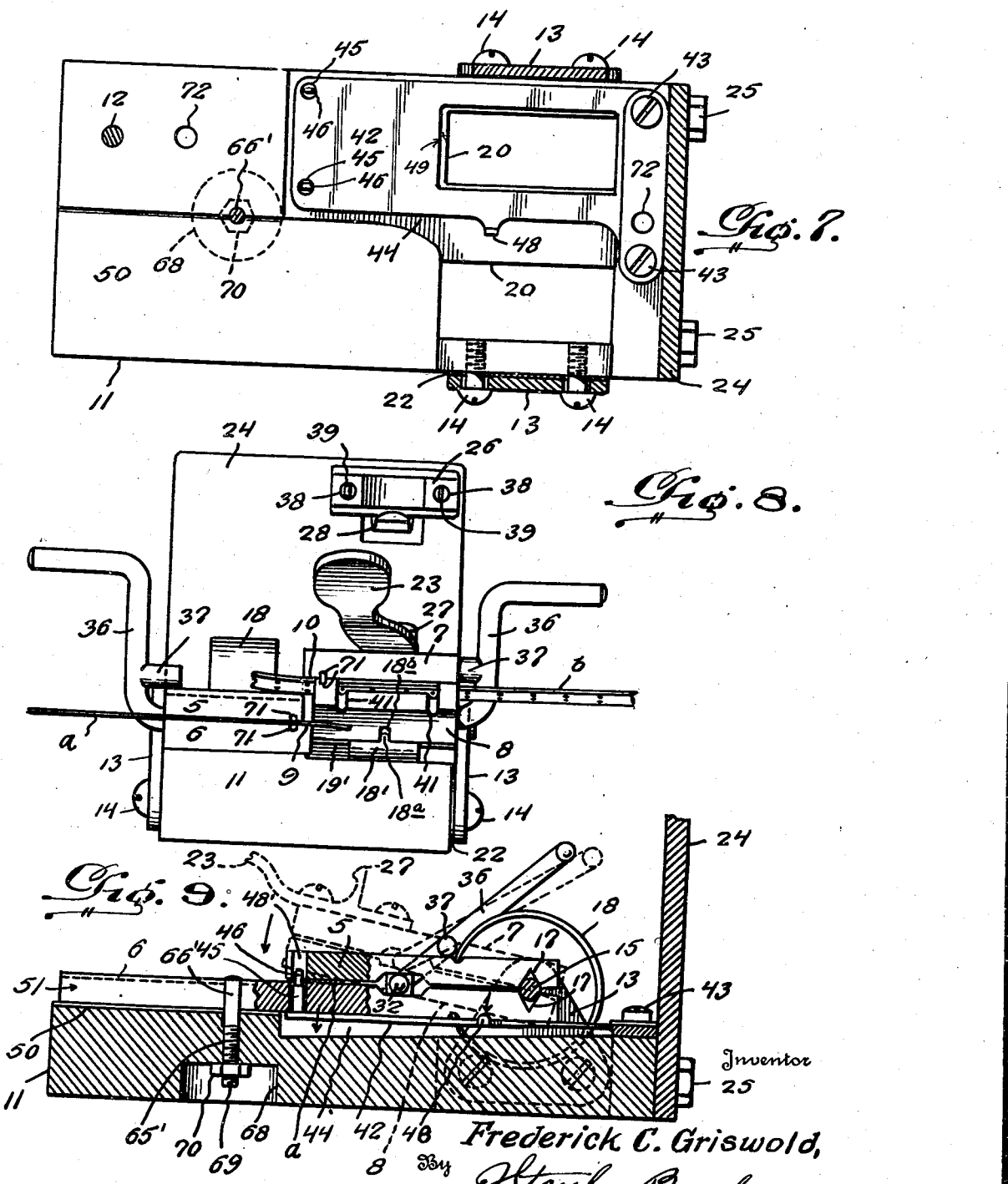

Inventor
Frederick C. Griswold,
By Stanley Burch
Attorney

Nov. 3, 1942.   F. S. GRISWOLD   2,300,888
FILM SPLICING DEVICE
Filed Feb. 28, 1940   6 Sheets-Sheet 6
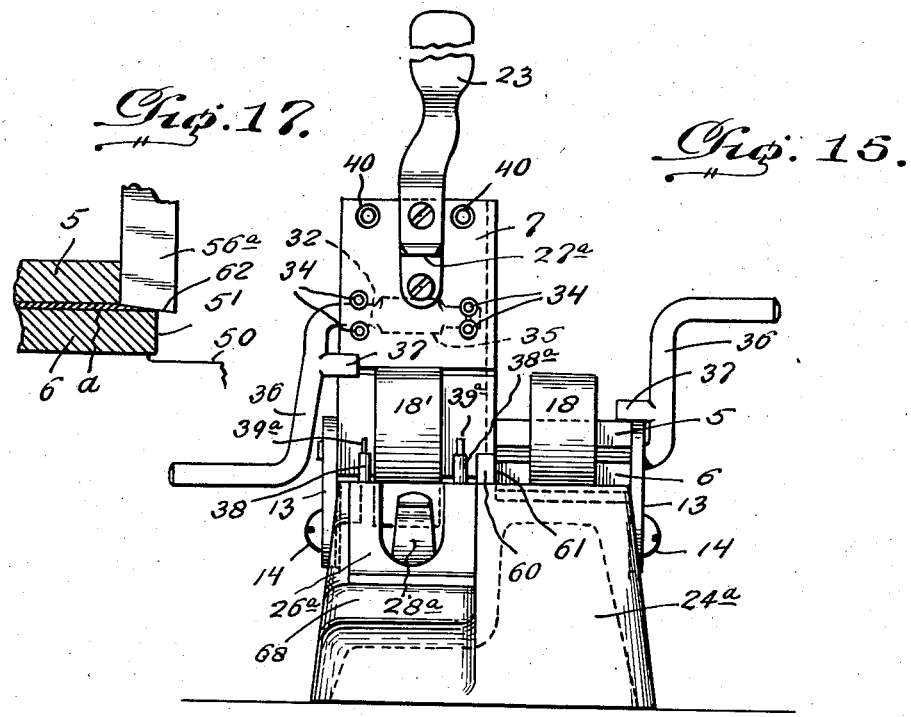
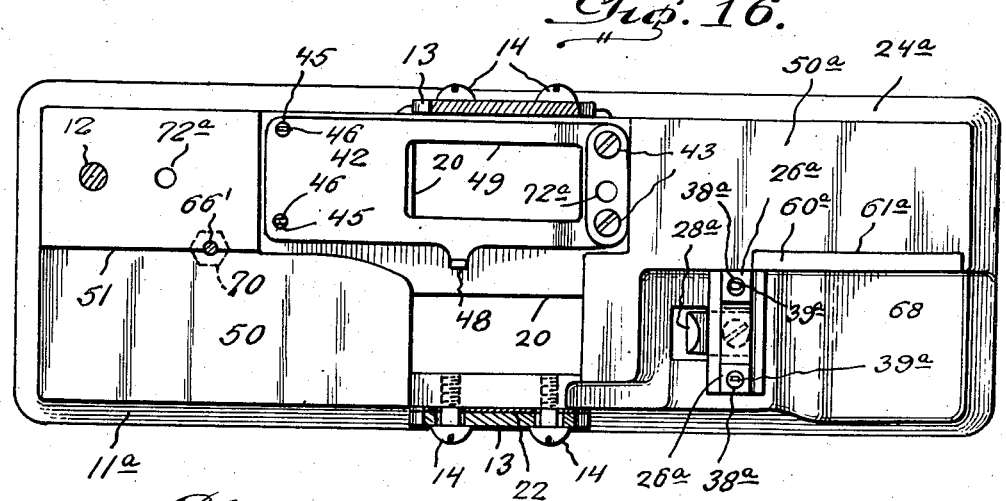
Inventor
Frederick C. Griswold,
By Stanley Burch
Attorney Patented Nov. 3, 1942

2,300,888

UNITED STATES PATENT OFFICE 2,300,888

FILM SPLICING DEVICE

Frederick C. Griswold, Port Jefferson, N. Y.

Application February 28, 1940, Serial No. 321,311

18 Claims. (Cl. 154—42)

This invention relates to a novel device for splicing films, whereby two portions of a film may be rapidly and accurately joined together.

An important object of the present invention is to provide a small portable film splicing device that is easy to manipulate, comparatively simple and inexpensive in construction, and otherwise well adapted to meet with all of the requirements for a successful commercial use.

A further object of the present invention is to provide a film splicing device having simple and efficient means whereby the ends of the portions of the film strip to be spliced or joined together may be brought into exact registry with each other so that the marginal perforations of the finished strip of film will not vary and the distance between said perforations will not be changed at the location of the splice.

A further object of the present invention is to provide a film splicer that is adapted to accurately shear the ends of the film strip portions to be joined, so as to provide the film portions with overlapped ends, and to press such overlapped ends together in order to complete the splice.

A still further object of the present invention is to provide an improved device for scraping the film where the splice is to be made, so as to remove the emulsion from the film as required in making an efficient splice.

Still another object of the present invention is to provide the splicing device proper and the film scraper with coacting surfaces which will serve to effectively guide the scraper as it is reciprocated to scrape the film.

With the above general objects in view, and many others which will become apparent as the nature of the invention is better understood, the present film splicing device consists in the novel form, combination and arrangement of parts hereinafter more fully described, shown in the accompanying drawings and claimed.

In the drawings:

Figure 1 is a side elevational view of a film splicing device constructed in accordance with the present invention and particularly adapted for use in making an ordinary lap splice or joint between portions of a film strip having emulsion only on one surface thereof.

Figure 2 is a view of the device shown in Figure 1, partly in top plan, and partly broken away and in section.

Figure 3 is a front elevational view of the device shown in Figure 1, with the swinging film clamp in rearwardly swung position.

Figure 4 is a side elevational view of the device as shown in Figure 3, together with the film scraper, said film scraper being in position whereby reciprocation of the same will cause removal of the emulsion from one portion of the film strip where the splice is to be made.

Figure 5 is a vertical transverse section on line 5—5 of Figure 4.

Figure 6 is a horizontal section on line 6—6 of Figure 1.

Figure 7 is a horizontal section on line 7—7 of Figure 1.

Figure 8 is a front elevational view of the device shown in Figure 1, the swinging clamp being swung forwardly and downwardly to the position where shearing of the film strip portions begins.

Figure 9 is a vertical longitudinal section on line 9—9 of Figure 6.

Figure 10 is a top plan view of the scraper.

Figure 11 is a fragmentary horizontal sectional view of the scraper taken on line 11—11 of Figure 4.

Figure 12 is an edge elevational view showing the portions of a film strip joined or spliced by use of the device shown in Figure 1.

Figure 15 is an end elevational view looking toward the left of Figure 13 and with the swinging film clamp in partially raised position.

Figure 16 is a horizontal section on line 16—16 of Figure 13.

Figure 17 is a detail view partly in section and partly in elevation illustrating a modified form of scraper blade employed with the device of Figure 13 so as to produce the bevel form of splice; and Figure 18 is an edge elevational view showing film strip portions having a beveled joint or splice as produced by use of the device of Figure 13 and the scraper blade of Figure 17.

Figure 13:
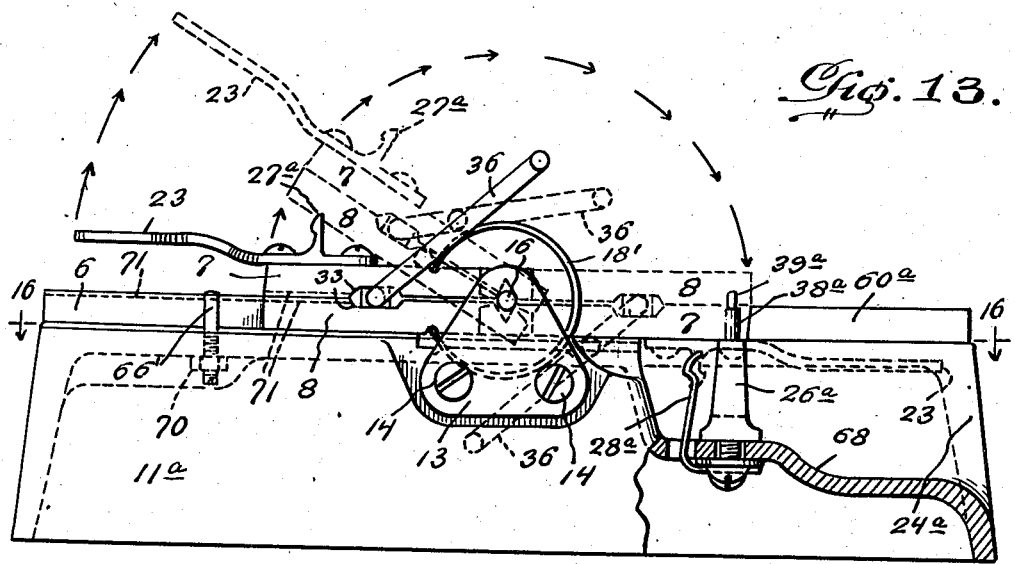
Figure 13 is a view, partly in side elevation and partly broken away and in section, of a modified form of film splicing device constructed in accordance with the present invention and particularly adapted for use where a beveled splice is desired or where it is desired to splice the ends of film strip portions having emulsion on both surfaces thereof.
Figure 14:
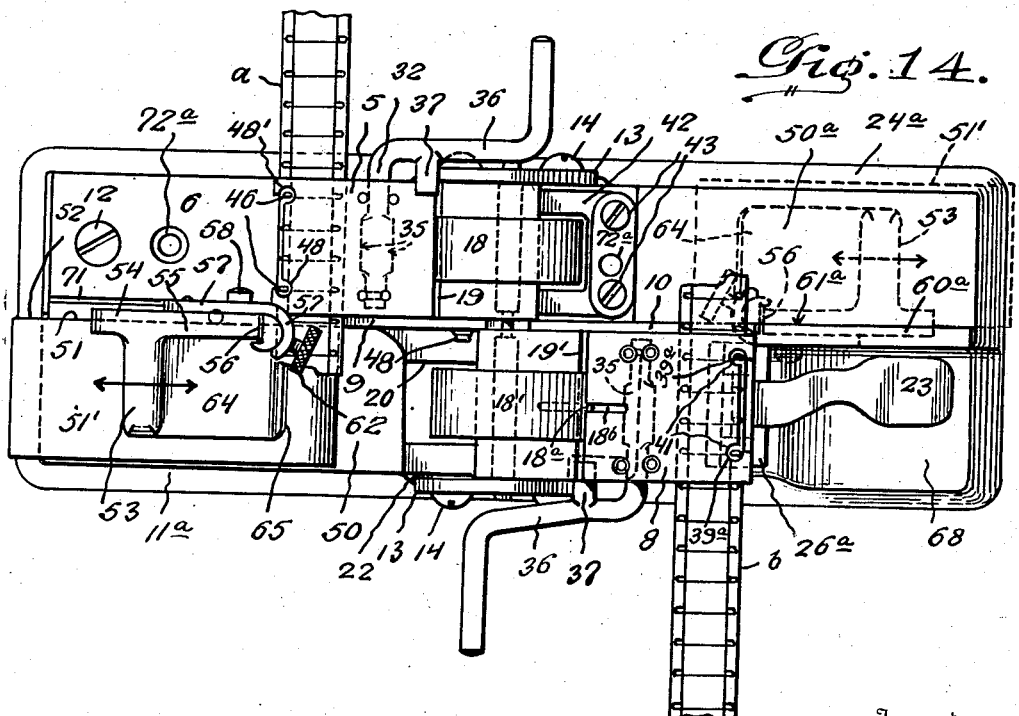
Figure 14 is a top plan view of the device shown in Figure 13.

Referring in detail to the drawings, the present splicing device includes two film clamps, each comprising a pair of coacting clamping jaws adapted to receive and hold a portion of the film to be spliced. One clamp comprises upper and lower jaws or jaw plates 5 and 6 that are adapted to receive the portion a of the film, and the other clamp comprises similar upper and lower jaws or jaw plates 7 and 8 that are adapted to receive the portion b of the film, an end of the portion b being adapted to be superimposed upon an end of the portion a when the splice is made.

As seen more clearly in Figures 3 and 8, the jaw 5 is narrower than the jaw 6, thereby providing an extended shoulder or shelf 9 at the inner side of this clamp upon which a part of the film portion a rests with its upper surface exposed. In a like manner, the jaw 8 is narrower than the jaw 7 so as to provide an extended shelf or shoulder 10 at the inner side of the clamp composed of said jaws 7 and 8, against which shoulder 10 a part of the film portion b is disposed with its lower surface exposed. The disposition of the jaws is such that the inner edges of jaws 5 and 7 are in alinement with each other, as are the corresponding edges of the jaws 6 and 8. The clamp composed of jaws 5 and 6 is stationary, whereas the clamp composed of jaws 7 and 8 is mounted for vertical swinging movement. Thus, when the clamp composed of jaws 7 and 8 is swung forwardly and downwardly, the jaws of the two clamps cooperate to shear the extended inner ends of the film portions, leaving narrow end portions on the shoulders 9 and 10 which will overlap a predetermined distance and will be pressed towether when the forward and downward swinging movement of the clamp 7, 8 is completed. By scraping the emulsion from the upper surface of the end of film portion a disposed on shoulder 9, and then applying cement to this scraped surface, it will be apparent that the joint or splice will be made as the ends of the film portions are sheared and the ends thereof remaining on the shoulders 9 and 10 are pressed together, upon the forward and downward swinging movement of the clamp 7, 8. By holding the clamp 7, 8 downwardly with slight pressure for a short period of time, a very efficient splice or joint is insured, the overlapping ends of the film portions being firmly pressed together between the shoulders 9 and 10.

An object of the present invention is to provide a small portable film splicer which, although very efficient in operation, may be manufactured to sell at a comparatively low cost. Accordingly, the device embodies a horizontal base or base plate 11, preferably of elongated rectangular form and of a width equal to the combined widths of the two film clamps, which are mounted on said base in side by side relation. The lower jaw 6 of one clamp is flatly disposed upon the base 11, on one side of the latter and rigidly secured thereon by any suitable means which may include a screw 12 passing through the forward end of jaw 6 and threaded into the base 11, with the head of said screw 12 countersunk in the upper surface of the jaw 6. Disposed against opposite sides of the base 11 and projecting upwardly therefrom are flat mounting brackets or plates 13 preferably fastened to the base 11 by means of screws 14 passing through the lower portions of said plates or brackets 13 and threaded into the base 11. A transverse shaft 15 is disposed above the rear end portion of the base 11 and has reduced ends 16 journaled in openings provided in the upper portions of the brackets or plates 13. The shaft 15 is disposed in mating V-shaped grooves 17 provided transversely of and in the adjacent faces of the jaws 5 and 6 and the jaws 7 and 8 near the rear ends of the latter, the jaws 5 and 6 being held together upon the shaft 15 by means of a C-shaped spring 18 passing about the rear ends of the jaws 5 and 6 and having its ends seated in transverse grooves 19 provided in the outer faces of the jaws 5 and 6 forwardly of the shaft 15. In this way, the upper jaw 5 is yieldingly urged into contact with the lower jaw 6 although capable of being swung away from the latter against the tension of the spring 18. In a like manner, the jaws 7 and 8 are held upon the shaft 15 by means of another C-shaped spring 18' passing around the rear ends of the jaws 7 and 8 and seated at its ends in transverse grooves 19' provided in the outer faces of the jaws 7 and 8 forwardly of the shaft 15. In this way, the clamp composed of jaws 7 and 8 is mounted for vertical swinging movement about and/or with the shaft 15, sufficient friction being set up between the shaft and the jaws so that the swinging clamp will remain in any position to which it is swung, although being capable of being manually moved. Also, the spring 18' acts to normally yieldingly hold the jaws 7 and 8 together while permitting manual separation thereof. The rear end portion of the base 11 has slots or recesses 20 to provide clearance for the springs 18 and 18'. It will be noted that the shaft 15 is considerably reduced in diameter intermediate its ends as at 21 (Figure 6), and the openings in one of the brackets 13 which receive the bolts 14 are of slightly greater diameter than the stems of said bolts which secure the bracket 13 to the base 11 at the outer side of the swinging clamp 7, 8. Thus, this bracket 13 may be adjusted forwardly to some extent, thereby slightly flexing the adjacent end portion of shaft 15 as permitted by the flexible reduced intermediate portion 21, and thus permitting the adjustment of the swinging clamp angularly so as to insure bringing the inner edges of the jaws 7 and 8 into proper shearing relation with the inner edges of the jaws 5 and 6. In order that the brackets or plates 13 may fit snugly against the outer edges of the clamps without undue frictional binding engagement with said edges, thin shim plates may be interposed between the brackets 13 and the base 11 as at 22 (see Figure 7). It will further be noted that the V-shaped grooves 17 in the jaws of the clamps which receive the shaft 15 are such as to reduce the area of contact of the jaws with the shaft so as to prevent undue binding therebetween, although the springs 18 and 18' are of considerable strength. A forwardly projecting handle 23 may be provided on the jaw 7 of the swinging clamp to facilitate manual movement of the latter.

The base 11 is provided at its rear end with an extension 24 which, in the embodiment of Figures 1 to 9 inclusive is in the nature of a vertical plate that may be bolted as at 25 against the rear end of said base. The extension 24 rises considerably above the base 11 and has attached to the upper portion thereof a member provided with horizontal forwardly projecting stop lugs 26 arranged in spaced side by side relation and adapted to be contacted at their forward ends by the jaw 7 to limit the upward swinging movement of the swinging clamp 7, 8 to a substantially vertical position. The swinging clamp is releasably held in this position by suitable means such as a flange catch 27 projecting upwardly from the jaw 7 and arranged in the path of a spring keeper 28 supported by the extension 24 directly beneath the stop lugs 26. The member having the stop lugs 26 may be secured against the forward face of the upper end portion of extension or plate 24 by means of bolts 29 passing through a washer plate 30 disposed against the rear face of extension 24 and through openings in said extension 24, and being threaded into said member. In a like manner, the spring keeper 28 may pass through an opening in the extension 24 and has an upturned end fastened against the washer plate 30 behind the extension 24 by means of a bolt 31 passing therethrough as well as through the washer plate 30 and being threaded into the extension 24.

A manually operable device is provided for swinging the jaw 5 away from the jaw 6 of the stationary clamp, and a similar device is provided for manually separating the jaws 7 and 8 of the swinging clamp. Each of these devices includes a rock shaft 32 disposed and journaled between the adjacent clamp jaws within mating grooves 33 provided transversely in the adjacent surfaces of said jaws forwardly of the shaft 15 and forwardly of the points where the ends of the associated spring 18 or 18' engages said jaws. The rock shaft 32 is retained in place so as to have free turning movement, by means of spaced pins 34 which pass inwardly through the jaw 5 and through the jaw 7 at opposite sides of the associated shaft 32 and near opposite ends of said shaft 32 as shown more clearly in Figures 1 and 2. The intermediate portion of each shaft 32 is provided with oppositely projecting cams 35 so that when the shaft 32 is rotated in one direction the associated jaws will be allowed to move together and when it is rotated in the opposite direction said jaws will be forced apart. The outer end of each shaft 32 has a handle 36 which is preferably in the nature of a crank having a lateral stop lug 37 projecting inwardly therefrom and arranged to engage the associated upper jaw 5 or 7 to properly limit the rocking movement of shaft 32 wherein the jaws are released or separated, as the case may be. The arrangement is such that the jaws of each clamp will remain separated until the associated rock shaft 32 is turned to permit the same to be forced together by the associated spring 18 or 18'.

Rigid with and extending forwardly from the stop lugs 26 are pins 38 terminating in suitable film-engaging teeth 39 and arranged to project through suitable small corresponding openings 40 provided in the upper jaw 7 of the swinging clamp, when the latter clamp is swung upwardly and rearwardly into contact with the stop lugs 26. The arrangement is such that when the jaws 7 and 8 are separated in this upwardly swung position of the clamp as shown in Figure 4, the portion b of the film may be introduced between the jaws 7 and 8 and impaled upon the teeth 39, said teeth 39 entering predetermined perforations adjacent the margin of the film portion b which is uppermost. When the jaws 7 and 8 are subsequently allowed to come together, the film portion b will be firmly clamped therebetween for proper registration with the film portion a when the swinging clamp is subsequently swung forwardly and downwardly to shear the ends of the film portions and complete the splice. Obviously, upon forward and downward swinging movement of the clamp 7, 8, the pins 38 and their teeth 39 will remain with the stop lugs 26 and pass out of the openings of the jaw 7. Suitable openings 41 are provided in the jaw 8, into which the teeth 39 are adapted to enter when the swinging clamp is swung to the upward and rearward position of Figure 4 and the jaw 8 is allowed to swing into contact with the film portion b. In order to insure proper position of the pins 38 with respect to the swinging clamp, the member carrying the stop lugs 26 and pins 38 is capable of limited vertical and lateral adjustment. For this purpose, the openings in the extension 24, through which the bolts 29 extend, are of slightly larger diameter than the stems of said bolts 29 as shown in Figure 2. When the member has been correctly adjusted, the bolts 29 are simply tightened to maintain the adjustment. In this way, proper alinement and registration of the film portions is insured when they are brought together to form the splice, insofar as the film portion b is concerned. Corresponding film registering means is associated with the stationary clamp, and the latter means includes a spring plate 42 mounted upon the base 11 beneath the lower jaw 6 of the stationary clamp, the rear end of plate 42 being anchored to the rear end of the base 11 by bolts 43 or the like passing through the plate 42 and threaded into the base 11. The base 11 is provided in its upper surface with a recess 44 as shown clearly in Figure 9, which accommodates the spring plate 42 and permits limited vertical flexing thereof. Rigid with and projecting upwardly from the forward end of spring plate 42 are pins 45 which are disposed in side by side relation and spaced a predetermined distance apart. The pins 45 terminate at their upper ends in suitable film-engaging teeth 46 and project upwardly through suitable small corresponding openings 47 provided in the jaw 6. Extending laterally from the inner edge of the spring plate 42 is a lug 48 arranged in the path of the jaw 8 of the swinging clamp, so that when the latter clamp is lowered it will engage the lug 48 and depress the forward portion of spring plate 42 so as to withdraw the teeth 46 from the openings in the margin of the film portion a. Naturally, when the swinging clamp is swung upwardly and rearwardly, the jaws 5 and 6 may be separated to permit introduction of the film portion a therebetween with the latter impaled upon the teeth 46, said teeth engaging predetermined openings along the margin of said film portion a which is foremost. Upon subsequent closing of jaw 5, the film portion a will be firmly held between the jaws 5 and 6 while the part of said film portion a which is disposed upon the shoulder 9 is being scraped to remove the emulsion therefrom. After scraping this part of the film portion a, the cement is applied to said scraped portion and the swinging clamp is lowered so as to shear the projecting ends of the film portions and press the remaining overlapping ends together to complete the splice. When the overlapping ends are pressed together between the shoulders 9 and 10, the teeth 46 will be retracted and the teeth 39 will of course not be engaged with the film portion b. Accordingly, by simply opening the clamps by use of the manual means described above, the spliced film may be freely removed. The upper jaw 5 of the stationary clamp is provided with suitable openings 48' to receive the teeth 46 when the film portion a is clamped between the jaws 5 and 6 prior to depression of the spring plate 42.

It will be noted that the teeth 39 and 46 nearest the inner edges of the clamps are relatively wide so as to snugly fit in the marginal perforations of the film strips and prevent any material movement of the latter transversely of the clamp jaws when said film strips are impaled on the teeth. However, the teeth 39 and 46 fartherest from the inner edges of the clamps are somewhat narrower so that they will engage in predetermined other marginal perforations of the film strips even through the distances between adjacent film openings may vary slightly due to shrinkage of the film. This allows for variation, within tolerance, of the exact distances between the marginal perforations of the film, but at the same time proper alinement of the film portions is insured when the splice is made. By setting the teeth 39 and 46 predetermined distances from the inner edges of the clamps, the ends of the portions of the film strip to be spliced or joined together will be brought into exact registry with each other so that the marginal perforations of the finished strip of film will not vary and the distance between said perforations will not be changed at the location of the splice. It will be noted, as shown more clearly in Figure 7, that the spring plate 42 has a slot 49 in its rear portion to provide clearance for the spring 18 which normally presses the jaw 5 of the stationary clamp toward its associated jaw 6.

The present invention embodies a scraper adapted to operate upon the part of the film portion a which rests upon the shoulder 9 while said film portion a is clamped between the jaws 5 and 6, so as to remove the emulsion therefrom. This is done while the film portion b is held between the jaws 7 and 8 of the swinging clamp and while the latter is in its upwardly and rearwardly swung position as shown more clearly in Figures 3 and 4, but with the jaws 7 and 8 closed instead of being open as shown in said Figure 4. For guiding this scraper, the base 11 has a flat upper surface portion 50 beside the stationary clamp, and the lower jaw 6 of the stationary clamp is extended forwardly beyond the upper jaw 5 to the forward end of the base 11 so as to provide a guiding edge 51 for the scraper among the inner side or edge of said lower jaw 6.

The scraper is shown in detail in Figures 4, 10 and 11, and comprises a horizontal plate-like base 51' having a flat bottom surface adapted to flatly engage the upper flat guiding surface 50 of the base 11. Also, the base 51' of the scraper is provided along one side with a flat edge 52 arranged to simultaneously engage the flat inner guiding edge 51 of the lower jaw 6 of the stationary clamp. Rigid with and rising from the base 51' is a transverse member 53 adapted to form a handle which may be gripped for reciprocating the scraper, and at the inner side of this member 53 is a rigid plate-like part 54 having a forwardly projecting portion 55 which is spaced above and extends outwardly beyond the side edge 52 of the base 51' as will be apparent from an inspection of Figure 10. This forwardly projecting portion 55 has a vertical flat front edge against which is adapted to be disposed the scraper blade 56 consisting of a thin flexible elongated strip of metal having end cutting edges. Means is provided to tightly clamp the blade 56 in place against the end edge of the portion or arm 55, which means consists of a clamping member 57 bolted or otherwise secured as at 58 to the projecting arm 55 and having an inwardly directed curved forward end portion 59 disposed in spaced relation to and forwardly of the forward edge of arm 55. A clamping block 60 of elongated form is disposed between the curved portion 59 and the forward end of arm 55, and this clamping block has a rounded side fitting the curved portion 59 of the clamping member 57. Also, the block 60 has a rabbeted portion 61 arranged to engage the front face of the blade 56 and the inner edge of the latter. Thus, when the block 60 is forced toward the forward end of the arm 55 and laterally and inwardly relative to the latter, the blade 56 will be firmly clamped against the end edge of said arm 55 and tightly held between the member 57 and the flanged side of the block 60. In this way, the blade 56 is firmly held against any movement in a truly vertical position so that the lower edge of the blade will be absolutely parallel with the film portion to be scraped. The part of the blade 56 projecting below the arm 55 will be freely flexible so that it may yield in opposite directions as the scraper is reciprocated in a manner generally well known in the art. This insures free movement of the scraper and an efficient scraping action. Means is provided for forcing the clamping block 60 toward the forward end of the arm 55 and laterally and inwardly relative to the same so as to effect the firm clamping of the blade in place, which means may consist of a set screw 62 threaded at an angle through the curved portion 59 of the clamping plate 57 and engaging in a transverse angularly disposed groove 63 provided in the clamping block 60 as shown more clearly in Figure 11. The latter arrangement provides for holding the block 60 in place or against vertical displacement while it is being tightened or when it is loosened. It is important to maintain the projecting end of the film portion a depressed while the part on the shoulder 9 is being scraped. For this purpose, I provide a horizontal guard plate 64 which projects forwardly from the handle member 53 and extends at the outer side of the blade 56 as well as forwardly of the latter with its forward end upturned as at 65. In this way, the projecting end of the film portion a is guided under the guard plate 64 so as to be depressed below the plane of the shoulder 9 while the scraping blade 56 is operating on the part of the film resting on said shoulder 9. As the blade 56 is held in a position with its lower edge outwardly of the inner edge of the base 51', it is properly positioned to engage the part of the film resting on the shoulder 9, when the scraper is reciprocated in contact with the guiding surface 50 and guiding edge 51. The forward end of base 51' of the scraper is preferably beveled forwardly and downwardly as at 66 so that it will ride under the projecting end of the film portion a even though the same is depressed by the guard plate 64.

In operation, the swinging clamp is swung upwardly and rearwardly, after which the film portions to be spliced are clamped between the jaws of the respective clamps. The part of the film portion a which rests on the shoulder 9 is then scraped to remove the emulsion therefrom, after which cement is applied to this scraped part. The swinging clamp is then lowered so as to shear the projecting ends of the film portions and to press together the overlapping ends of the film portions which remain between the shoulders 9 and 10. The jaws of the clamps are then released so that the spliced film strip may be removed, the teeth 39 having been withdrawn from the film portion b when the swinging clamp was lowered, and the teeth 46 having been withdrawn from the film portion a by the prior depression of spring plate 42 effected by engagement of the jaw 8 with the lug 48 during the lowering of the swinging clamp. It will of course be understood that the splicing operation described will effect an ordinary lap joint or splice in connection with a film having emulsion only on one surface thereof. To do this, the film portion *a* must be disposed with its emulsion surface uppermost and the film portion *b* must be disposed with its emulsion surface disposed rearwardly with respect to the swinging clamp when the latter is in raised position.

It is sometimes necessary to splice a film having emulsion on both surfaces thereof, or to scrape both film portions in order to produce a beveled joint or splice of no greater thickness than the thickness of the film itself. A modification of the invention adapted to meet these conditions is illustrated in Figures 13 to 16 inclusive. As shown in the latter figures, the base 11a may be in the form of a hollow casting instead of in the form of a solid block, and, instead of providing the base at its rear end with the vertical extension 24 as in the form of Figure 1, said base is simply horizontally extended in length to provide a rearwardly extending portion 24a which, rearwardly of the swinging clamp, may have a depression 68 in which is mounted the member provided with the projecting stop lugs 26a corresponding to the stop lugs 26. The arrangement in this form is such that the stop lugs 26a project upwardly to the upper surface of the base and the pins 38a terminating in the teeth 39a are rigid with and project upwardly from the lugs 26a in position to enter the openings of the jaws of the swinging clamp when the latter is swung upwardly and rearwardly to a substantially horizontal rearwardly extending position as indicated by dotted lines in Figure 13. The member provided with the stop lugs 26a is mounted on the base in substantially the same way as the corresponding member is mounted on the extension 24 in the form of Figure 1, and similar catch means 27a and 28a are provided for retaining the swinging clamp in its rearwardly swung position. The primary difference between the two forms of the invention is that in the form of Figure 13 the swinging clamp is allowed a horizontal rearward position, and the rearwardly extending portion of the base 11a is provided with a horizontal upper guiding surface 50a to receive the scraper and guide it so that the emulsion may be removed from the projecting end of the film portion *b* when the swinging clamp is in its rearwardly swung horizontal position. Thus, the projecting ends of both film portions may be scraped by use of the same scraper having the form and construction described in connection with Figures 4, 10 and 11 inclusive. Of course, the base 11a will be provided along the inner side of the guiding surface 50a with a raised shoulder 60a on the extended portion 24a which is beyond the jaws of the swinging clamp when the latter is in its rearwardly swung position. This raised shoulder will provide a side guiding edge 61a at this point for the scraper which will aline with the inner edge of the clamping jaw 7 of the swinging clamp when the latter is in such rearwardly swung position. In this way, provision is made to remove the emulsion from the ends of both film strip portions in cases where emulsion is provided on both surfaces of the film strip, thus insuring an efficient splice when such is the case. Otherwise, the construction of both embodiments is the same and remaining corresponding parts are indicated by like reference numerals in both forms of the invention.

As also indicated above, the embodiment of Figures 13 to 16 inclusive is well adapted for use where it is desired to scrape the projecting ends of both film portions and to bevel such ends so as to produce a thin beveled joint or splice. The manner in which the ends of film portions are beveled to bring this about is generally well known in the art, and the only change required in forming such a splice is to provide the scraper blade 56a with a laterally inclined lower scraping edge as indicated at 62 in Figure 17. The latter figure illustrates the manner in which the ends of the film portions are beveled by the use of this form of scraping blade, and the beveled joint or splice produced is illustrated clearly in Figure 18 at 63. Incidentally, the ordinary overlapping splice produced by use of the device shown in Figure 1 has been shown in Figure 12, the overlapped splice indicated at 64', with the joint of slightly greater thickness than the thickness of the film strip itself.

It is important to adjust the scraping blade 56 very accurately so that its lower scraping edge is a definite distance above the shoulder 9, thus insuring complete removal of the emulsion from the film portion although not materially reducing the thickness of the film strip body. In order to facilitate this correct adjustment of the blade 56 while the scraper is properly resting upon the top guiding surface 50 of the base 11 or upon the similar top guiding surface of the base 11a, I provide such base with a vertical opening 65' in which is threaded the lower portion of a vertical pin 66' as shown more clearly in Figures 1, 2 and 9. The forward projecting end portion of the lower jaw 6 of the stationary clamp has a vertical groove in the inner edge thereof as at 67 in which the upper end portion of pin 66' is disposed. Thus, by turning the pin 66' it may be vertically adjusted to protrude a definite distance above the shoulder 9 of the jaw 6 at a point forwardly of the jaw 5. By disposing the base 51' of the scraper on the surface 50 and against the guiding edge 51, the blade 56 of the scraper may be adjusted into contact with the upper end of the pin 66' so as to set the scraper blade with its scraping edge the correct distance above the shoulder 9. A gage pin of this kind arranged in the manner indicated enables positioning of the blade in the scraper with facility and ease so that proper scraping of the film is insured to completely remove the emulsion and at the same time not materially reduce the thickness of the film strip body. The lower end of pin 66' is preferably accessible from the bottom of the base 11 or 11a by reason of a recess 68 provided in the base as shown in Figure 9, the lower end of pin 66' being disposed centrally of this recess and having a kerf 69 cut in its lower end. A jamb nut 70 may be threaded on the lower end of pin 66' and tightened into engagement with the base to fix the adjustment of the pin 66'. By loosening nut 70, a screw driver may be engaged in the kerf 69 to turn the pin 66' and effect its proper adjustment.

It will be noted that the cement is applied to the film portions while firmly clamped between the clamping jaws. Ordinarily, the cement, which is in liquid form, would flow by capillary attraction in between the jaws, thus producing a messy and undesirable condition. In order to prevent this, I provided longitudinal opposed grooves 71 in the adjacent surfaces of the jaws of both clamps, which grooves are disposed very close to the inner edges of the narrower jaws 5 and 8 as shown clearly in Figure 8. When clearance is provided in this way, the tendency of the cement to flow inwardly between the jaws is overcome. In other words, the grooves 71 provide an open space between the upper and lower jaws, as well as between the film and the jaws. It has been found that film cement is carried a considerable distance by capillary attraction between two surfaces that are slightly separated, but which permit the cement to contact opposing surfaces at the same time. The grooves 71 are made large enough to prevent the cement from contacting two surfaces so that the capillary action is prevented at such groove.

It is particularly pointed out that a very simple form of scraper is required in connection with the present device, in which flat under and side supporting and guiding surfaces are all that are needed, the flat under surface of the base 51' of the scraper engaging the flat upper surface portion 50 of the base, and the flat inner edge 52 of the scraper base engaging the adjacent flat edge 51 of the lower jaw 6 of the stationary clamp. Inward and downward pressure on the scraper is all that is needed while being operated, and elaborate guideways or guide ribs on the device or the scraper are unnecessary. Also, the relation is such that the scraping blade does not protrude below the base of the scraper and a very compact and durable construction of scraper is possible. In the embodiment of Figure 13, the scraper is horizontally disposed on the base in scraping both film portions, inversion of the scraper being unnecessary for operation upon the film portion b held by the swinging clamp.

Lateral displacement of springs 18 and 18' may be prevented by providing the ends thereof with projecting lugs 18a engaging in longitudinal recesses 18b provided in the jaws of the clamps so as to intersect the grooves 19 and 19' thereof. Also, the base 11 or 11a may have openings 72 or 72a to receive bolts for fastening the device to a bench top or like support.

From the foregoing description, it is believed that the construction and operation, as well as the many advantages of the present invention will be readily understood and appreciated by those skilled in the art. While I have herein illustrated and described certain specific means and embodiments for carrying out my invention, it will be obvious that many modifications are possible without materially departing from the spirit of the invention.

What I claim as new is:

1. A film splicing device comprising a base, a stationary film clamp and a swinging film clamp mounted upon the base in contiguous side by side relation, a normally operative film registering device associated with the stationary clamp, and means operable by the swinging clamp for rendering said film registering device inoperative upon movement of the swinging clamp toward the stationary clamp.

2. A film splicing device comprising a base, a stationary film clamp and a swinging film clamp mounted upon the base in contiguous side by side relation, a normally operative film registering device associated with the stationary clamp, means operable by the swinging clamp for rendering said film registering device inoperative upon movement of the swinging clamp toward the stationary clamp, and a second stationary film registering device arranged to assume operative relation to the swinging clamp when the latter is swung away from the stationary clamp.

3. A film splicing device comprising a base, a stationary film clamp and a swinging film clamp mounted upon said base in contiguous side by side relation, each of said clamps comprising a pair of clamping jaws, spring means normally urging the jaws of each clamp together, and manually operable means interposed between the jaws of each clamp for separating said jaws against the action of said spring means.

4. A film splicing device comprising a base, a stationary film clamp and a swinging film clamp mounted upon said base in contiguous side by side relation, each of said clamps comprising a pair of clamping jaws, spring means normally urging the jaws of each clamp together, manually operable means interposed between the jaws of each clamp for separating said jaws against the action of said spring means, and a common supporting shaft for said clamps mounted above and extending transversely of the base, said shaft extending between the jaws of the respective clamps, and said jaws of the clamps being held in engagement with said shaft by said spring means.

5. A film splicing device comprising a base, a stationary film clamp and a swinging film clamp mounted on said base in contiguous side by side relation, a normally operative film registering device associated with the stationary clamp and including a vertically yieldable spring plate mounted beneath the stationary clamp and having upwardly projecting pins terminating in film-engaging teeth, the lower jaw of said stationary clamp having openings into which said pins project.

6. A film splicing device comprising a base, a stationary film clamp and a swinging film clamp mounted on said base in contiguous side by side relation, a normally operative film registering device associated with the stationary clamp and including a vertically yieldable spring plate mounted beneath the stationary clamp and having upwardly projecting pins terminating in film-engaging teeth, the lower jaw of said stationary clamp having openings into which said pins project, and a lug projecting from said spring plate in the path of said swinging clamp whereby said film registering device is rendered inoperative upon swinging movement of the swinging clamp toward the stationary clamp.

7. In a film splicing device, a base, a shaft mounted transversely above the base, a film clamp comprising a pair of jaws having mating transverse grooves in the adjacent faces thereof near corresponding ends of the same, said grooves receiving said shaft, and a C-shaped spring passing about such ends of the jaws and having its ends engaging the outer faces of the jaws forwardly of said shaft to normally urge the jaws together.

8. In a film splicing device, a base, a shaft mounted transversely above the base, a film clamp comprising a pair of jaws having mating transverse grooves in the adjacent faces thereof near corresponding ends of the same, said grooves receiving said shaft, a C-shaped spring passing about such ends of the jaws and having its ends engaging the outer faces of the jaw forwardly of said shaft to normally urge the jaws together, and manually operable means for separating the jaws against the action of said spring, said last-named means including a rock shaft disposed between the jaws and having cam lugs arranged to engage and spread the jaws when the rock shaft is turned in one direction, and a handle on one end of said rock shaft.

9. A film splicing device comprising a base, a stationary film clamp and a swinging film clamp mounted on said base in contiguous side by side relation, the adjacent sides of said clamps being so related as to shear the film held by the respective clamps when the swinging clamp is swung toward the stationary clamp, and a common supporting shaft for said clamps having a flexible intermediate portion, the mounting means for said shaft including a mounting member for one end of the shaft movable for flexing the portion of the shaft carrying the swinging clamp relative to the portion of the shaft carrying the stationary clamp whereby to maintain most efficient shearing relation between the clamps.

10. A film splicing device comprising a horizontal base, a stationary film clamp and a swinging film clamp mounted in contiguous side by side relation upon the base, said stationary clamp including a lower jaw fixed to the base and having a straight inner side edge, said base having a flat upper surface portion beside said stationary jaw.

11. A film splicing machine including a horizontal base, a stationary film clamp and a swinging film clamp mounted upon said base in contiguous side by side relation, the adjacent sides of said clamps being so related as to shear the film held by said clamps when the swinging clamp is swung forwardly and downwardly toward said stationary clamp, an extension on the rear of said base, a projecting member attached to said extension and having stop lugs arranged to limit the upward and rearward swinging movement of the swinging clamp, said swinging clamp having an upper jaw provided with openings, and a film registering device including projecting pins carried by said stop lugs and terminating in film-engaging teeth, said pins being arranged to enter the openings of the upper jaw of the swinging clamp when the latter is swung upwardly and rearwardly away from said stationary clamp.

12. A film splicing machine including a horizontal base, a stationary film clamp and a swinging film clamp mounted upon said base in contiguous side by side relation, the adjacent sides of said clamps being so related as to shear the film held by said clamps when the swinging clamp is swung forwardly and downwardly toward said stationary clamp, an extension on the rear of said base, a projecting member attached to said extension and having stop lugs arranged to limit the upward and rearward swinging movement of the swinging clamp, said swinging clamp having an upper jaw provided with openings, a film registering device including projecting pins carried by said stop lugs and terminating in film-engaging teeth, said pins being arranged to enter the openings of the upper jaw of the swinging clamp when the latter is swung upwardly and rearwardly away from said stationary clamp, and means to releasably latch the swinging clamp in its upward and rearwardly swung position.

13. The combination with a base, a film supporting member fixed to the base and providing a shoulder on which rests an end portion of a piece of film to be scraped, said member having a straight inner edge, and said base having a flat upper surface portion beside said member cooperating with said straight edge to guide a scraper in position to operate upon such portion of the film resting on said shoulder, of a scraper consisting of a base having a flat undersurface arranged to flatly rest upon the flat surface portion of the base and having a straight edge at one side arranged to flatly engage the inner straight edge of said member, a standard rising from the base of the scraper and provided with a projecting arm overhanging the scraper base, and means associated with said arm for securing a scraping blade in position with its lower edge disposed above the scraper base and beyond said straight side edge thereof in position to act upon the portion of the film resting on said shoulder.

14. A film splicing device comprising a horizontal elongated base, a stationary film clamp and a swinging film clamp mounted upon said base in contiguous side by side relation, each of said clamps being provided at its inner side with a shoulder upon which the end of the film to be spliced rests, the upper surface of the base and the inner edge of one jaw of the stationary clamp cooperating to guide a scraper, the upper surface of the base rearwardly of said stationary clamp having a flat scraper guiding portion beside the swinging clamp when the latter is swung to a rearwardly projecting horizontal position, and means on the base cooperating with a jaw of the swinging clamp when in such rearwardly swung position for guiding the scraper to act upon the portion of the film held by said swinging clamp.

15. A film splicing device comprising a horizontal elongated base, a stationary film clamp and a swinging film clamp mounted upon said base in contiguous side by side relation, each of said clamps being provided at its inner side with a shoulder upon which the end of the film to be spliced rests, the upper surface of the base and the inner edge of one jaw of the stationary clamp cooperating to guide a scraper, the upper surface of the base rearwardly of said stationary clamp having a flat scraper guiding portion beside the swinging clamp when the latter is swung to a rearwardly projecting horizontal position, means on the base cooperating with a jaw of the swinging clamp when in such rearwardly swung position for guiding the scraper to act upon the portion of the film held by said swinging clamp, a film registering device arranged to assume an operative relation to the swinging clamp when the latter is swung rearwardly, a second normally operative film registering device associated with the stationary clamp, and means for rendering the last-named film registering device inoperative when the swinging film clamp is swung toward the stationary clamp for bringing the pieces of film in alinement.

16. A film splicing device comprising a horizontal base, a stationary film clamp and a swinging film clamp mounted in contiguous side by side relation upon the base, said stationary clamp including a lower jaw fixed to the base and having a straight inner side edge, said base having a flat upper surface portion beside said stationary jaw cooperating with the inner side edge of said stationary jaw for guiding a scraper for the film portion held by said stationary clamp, said lower jaw having a forwardly projecting end portion provided with a vertical groove in the inner side edge thereof, and a vertically adjustable gage pin carried by said base and projecting through said vertical groove to a point slightly above the upper surface of said lower jaw for contact by the lower edge of the blade of a scraper resting on said flat upper surface portion of the base, whereby to facilitate setting of said blade.

17. In a film splicing device, a main supporting base, a film supporting member mounted on said base, and a film scraper slidable on said base beside said member, said base and said member having surfaces coacting with surfaces of said film scraper to guide the latter relative to the film.

18. In a film splicing device, a main supporting base, a film supporting member mounted on said base, a film scraper slidable on said base beside said member, said base and said member having surfaces coacting with surfaces of said film scraper to guide the latter relative to the film, said film scraper comprising a base member, a vertical member rising from said base member and having a forwardly projecting arm overhanging said base member, a scraping blade, and means carried by an end of said arm for clamping said scraping blade in a vertical position with its lower edge disposed outwardly beyond one side of and above said base member.

FREDERICK C. GRISWOLD.

CERTIFICATE OF CORRECTION.

Patent No. 2,300,888. November 3, 1942.

FREDERICK C. GRISWOLD.

It is hereby certified that error appears in the above numbered patent requiring correction as follows: In the heading to the drawings, Sheets 1 to 6 inclusive, line 1, name of inventor, for "F. S. GRISWOLD" read --F. C. GRISWOLD--; and that the said Letters Patent should be read with this correction therein that the same may conform to the record of the case in the Patent Office.

Signed and sealed this 9th day of February, A. D. 1943.

Henry Van Arsdale,
Acting Commissioner of Patents.